United States Patent [19]

Johnson

[11] Patent Number: 4,652,200

[45] Date of Patent: Mar. 24, 1987

[54] HANDLING APPARATUS AND METHOD

[75] Inventor: Frank Johnson, Crowborough, Great Britain

[73] Assignee: Wellform Engineering Company, Ltd., Sussex, England

[21] Appl. No.: 720,257

[22] Filed: Apr. 5, 1985

[30] Foreign Application Priority Data

Apr. 11, 1984 [GB] United Kingdom ............... 8409385
Nov. 5, 1984 [GB] United Kingdom ............... 8427963

[51] Int. Cl.⁴ .............................................. B65G 65/36
[52] U.S. Cl. ...................................... 414/416; 29/726;
198/394; 198/416; 221/173; 221/211; 294/64.1;
414/121; 414/786
[58] Field of Search ..................... 414/16, 14, 17, 18,
414/121, 415, 416, 417, 746, 752, 780, 781, 786;
294/64.1; 198/416, 394; 193/46; 29/726;
221/173, 211; 269/21; 248/362, 363

[56] References Cited

U.S. PATENT DOCUMENTS

| 2,823,786 | 2/1958 | Grogg, Jr. .................. | 414/416 X |
| 3,144,740 | 8/1964 | Erickson et al. ............ | 198/416 X |
| 3,765,289 | 10/1973 | Gerber et al. .............. | 269/21 X |
| 3,789,479 | 2/1974 | Zifferer et al. ............. | 29/726 |
| 4,066,534 | 1/1978 | Arya ......................... | 414/752 X |
| 4,162,018 | 7/1979 | Arya ......................... | 414/416 X |
| 4,175,676 | 11/1979 | Renaud et al. ............. | 221/211 |
| 4,362,461 | 12/1982 | Cathers ..................... | 414/744 B X |
| 4,397,602 | 8/1983 | North ......................... | 414/415 |
| 4,402,173 | 9/1983 | Thierion ..................... | 414/121 X |

FOREIGN PATENT DOCUMENTS

| 723468 | 12/1965 | Canada ..................... | 198/416 |
| 146370 | 11/1979 | Japan ....................... | 414/415 |

Primary Examiner—Leslie J. Paperner
Attorney, Agent, or Firm—Phillips, Moore, Lempio & Finley

[57] ABSTRACT

Apparatus and method for removing a set of linear objects such as helically coiled turbolaters (11) from a container (12) of objects, comprising a cover (17) including holes (37) from which air is drawn to cause some of the objects (11) to engage the underside of the cover (17) and an obturator plate for reducing the air flow through the holes (37) so that the objects (11) correctly engaged with the cover will detach from the cover (17). A feed mechanism is also provided to insert the helically coiled objects (11) into the tubes (13) of a radiator (14).

22 Claims, 12 Drawing Figures

HANDLING APPARATUS AND METHOD

TECHNICAL FIELD

The present invention relates to a handling apparatus and method. Preferably the apparatus and method is for handling helically coiled objects.

BACKGROUND OF THE INVENTION

Because of their shape, helically coiled objects are very difficult to handle. This is particularly so if the helically coiled objects are made of a relatively soft material such as aluminium, for example so called "turbolaters" made according to our copending British patent application No. 8313162, now European patent application No. 84302487 (published under No. 125792). The turbolaters are twisted strips of material which are to be inserted into the tubes of radiators or heat exchangers to cause the water or liquid passing through the heat exchanger to swirl as it passes along the tubes and thereby increase the heat transferring efficiency of the radiator or heat exchanger. It is desirable that the turbolaters be made of as thin material as possible and also of lightweight material and because of this they are relatively easily damaged and very difficult to handle.

Our earlier European patent publication No. 125792 describes a method for making the turbolaters which are then stored in a container. A problem then arises in removing the turbolaters from the container because they are very light in weight (typically less than 5 g) and therefore easily disturbed during storage in the container and so become entangled and interengaged with one another.

In a preferred arrangement therefore the apparatus and method of the invention is intended to remove the turbolaters from a container and to feed them to a position in which they may be inserted, for example, into the tubes of a radiator or heat exchanger. (Through the rest of this Specification the term "radiator" will be used as covering both radiators for use in, for example, motor vehicles and heat exchangers for other uses.)

During the development of the present apparatus a number of methods of removing the turbolaters from a container have been tried. For example mechanical means has been provided to remove the turbolaters by providing a ramped portion alongside the container but it has been found that the turbolaters are not fed out of the container in a regular fashion but can frequently become engaged with one another.

Various means for handling generally cylindrical articles have been evolved. For example in U.S. Pat. No. 4,162,018 there is disclosed apparatus for transferring nuclear fuel rods from a conveyer into a container. However the nuclear fuel rods are accurately cylindrical and therefore at all times are maintained in a known predetermined relationship to one another, beside one another and exactly parallel to one another and it is therefore a simple matter to arrange a transfer unit which will substantially accurately engage with a supply of nuclear free rods, apply vacuum to lift the fuel rods and to place them in a container and vice versa. Such an arrangement would not, however, be suitable for use with lightweight turbolaters because, in the container, the turbolaters are not accurately spaced from one another but as mentioned above are entangled with one another and are not necessarily exactly parallel with one another and so it is necessary to find some way to release the turbolaters from one another to allow them to be picked up by the vacuum and also to ensure that only a predetermined number of turbolaters are picked up since, owing to their light weight, more than the desired number may become attached to the lifting mechanism by vacuum.

SUMMARY OF THE INVENTION

The present invention provides apparatus for removing one or more linear objects from a container containing a plurality of said objects said apparatus comprising an open top container containing a plurality of said objects, cover means having holes therein, means for moving said cover means to a first position in which it covers or substantially covers the objects in the container means for producing, whilst said cover means is in said first position, an airflow through the holes in said cover to cause some of the objects to move up and engage with the underside of said cover means, said cover means including on its underside one or more shaped portions to engage with a respective one of said objects, characterised in said cover moving means is adapted to move said cover means to a second position after reducing said airflow to cause objects other than those engaged in said shaped portions to detach from said cover means.

Apparatus according to the invention has been found to reliably remove linear objects such as helically coiled turbolaters from the container.

Said shaped portions may comprise grooves on the underside of the cover means.

In order to improve the movement of the turbolaters towards the cover whilst the air is flowing through the holes in said cover, the turbolaters within the container may be thrown up by movement of the bottom of the container and, in addition, the bottom of the container may be moved up during operation of the apparatus so as to maintain the upper level of the top of the turbolaters within the container adjacent the open top of the container.

In a preferred arrangement more than one groove may be provided in the undersurface of the cover means. These grooves may be arranged parallel to one another and spaced a predetermined distance apart.

In a preferred arrangement the means for causing the airflow through the holes may comprise a vacuum source connected to the cover means, and conveniently there may be provided above the cover a vacuum chamber.

In the second position, the cover means may overlie a plate member. In a preferred arrangement the groove or grooves may extend from side to side of the cover means and in the second position means may be provided to feed the helically coiled objects in the grooves from the grooves. This feed means may comprise a plurality of rods which enter the grooves when the cover means is in the second position. In a preferred arrangement means may be provided to mount a radiator alongside the cover means when in the second position and the predetermined distance between the grooves may correspond to the distance between the tubes in the radiator so that the helically coiled objects may be fed from the grooves directly into the tubes in the radiator.

The apparatus and method of the invention therefore provide a reliable and effective method of removing turbolaters from a container and feeding them into the tubes of a radiator. In a particular trial, seven turbolaters were removed during each cycle of operation and were fed into the tubes of a radiator within six seconds cycle time. However, other numbers of turbolaters may readily be removed and fed into a radiator within the same time cycle.

BRIEF DESCRIPTION OF THE DRAWINGS

Preferred arrangements of the invention will now be described by way of example only and with reference to the accompanying drawings in which.

DESCRIPTION OF THE PREFERRED EMBODIMENTS

Figure 1:
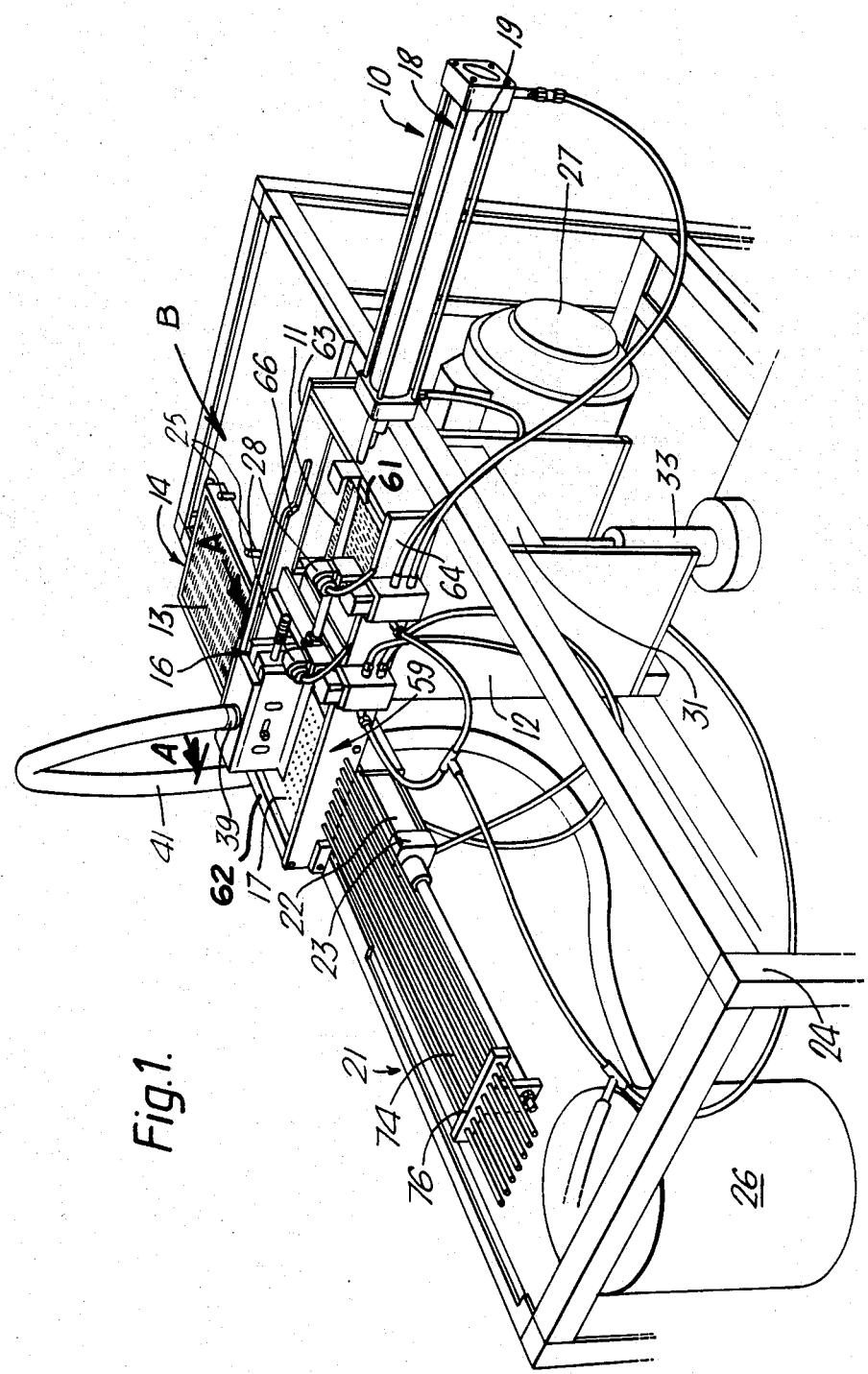
FIG. 1 is a perspective view of a handling apparatus according to the invention, showing a transfer means 16 shifted generally leftwardly to its assembly position that is also shown in FIGS. 4 and 6.

Referring to FIG. 1 there is shown a perspective view of an apparatus according to the invention. The apparatus is adapted to remove turbolaters 11 from a container 12 and insert them into the tubes 13 of a radiator 14.

Figure 5:
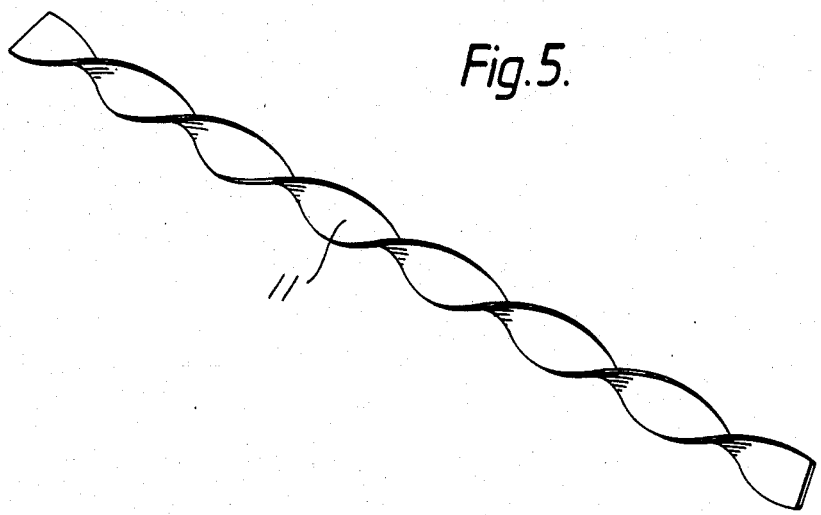
FIG. 5 is a perspective view of a twisted metal strip comprising a turbolater.

The turbolaters may comprise twisted helical strips of metal made in accordance with our European patent publication No. 125792, that is comprising a twisted strip of thin aluminium, the general form of which is illustrated in FIG. 5.

Such turbolaters are extremely difficult to handle. They are manufactured in preset lengths and packed loosely in containers or cases and in the course of packing and transportation they tend to become randomly arranged and engaged with one another although their axes will generally be substantially parallel to one another. It is not practical to pack the turbolaters separately because of the high expense involved and so the only practical means for storing and transportation of the turbolaters in bulk is loose in a container.

Problems arise when it is required to remove the turbolaters from the container to insert them into the tubes in a radiator. Hitherto this operation has been carried out manually or semi-automatically, the turbolaters being provided in the form of plastic turbolaters which are therefore more flexible and wound on a very large reel as a long length and fed by hand one at a time into the tubes of a radiator.

The present apparatus allows one to pick up a predetermined number of turbolaters readily from a container in which they are stored and to insert that predetermined number of turbolaters in one operation into the corresponding predetermined number of tubes in a radiator. Utilising the apparatus described it was found that, for example, seven turbolaters could be removed from the container in which they were stored and fed into seven tubes in a radiator within six seconds. It would with minor modification be possible to carry out the same operation with more or less numbers of turbolaters.

Although we refer throughout the specification to turbolaters and in particular turbolaters manufactured of aluminium, it will be understood that the invention is applicable to other twisted strip material, for example, turbolaters made of plastics and to other objects such as tubes.

The general layout of the apparatus can be seen from FIG. 1 in which the turbolaters 11 are removed from the container 12 by a transfer means 16 in the form of a cover 17, the transfer means 16 being movable by an actuator 18 in the form of a hydraulic piston/cylinder assembly 19 from a position in which it overlays the container 12 and in which it removes the desired number of turbolaters 11 to a position (shown in FIG. 1) adjacent the radiator 14 in which latter position the turbolaters are fed from the transfer means 16 by a feed mechanism 21 driven by an actuator 22 in the form of a hydraulic piston/cylinder assembly 23. The feed mechanism 21 feeds the turbolaters into the tubes 13 in the radiator 14. The parts of the apparatus thus far described are mounted on a steel frame 24 and clamp means 25, to accurately align the radiator in its desired position in which the turbolaters may be inserted into the tubes 13.

Mounted to the frame 24 is a vacuum pump 26 and an electric motor 27 for providing pressurised hydraulic fluid to operate the hydraulic piston/cylinder assemblies 19,23. Operation of these hydraulic piston/cylinder assemblies 19,23 is controlled by means of valves shown generally at 28.

Figure 2:
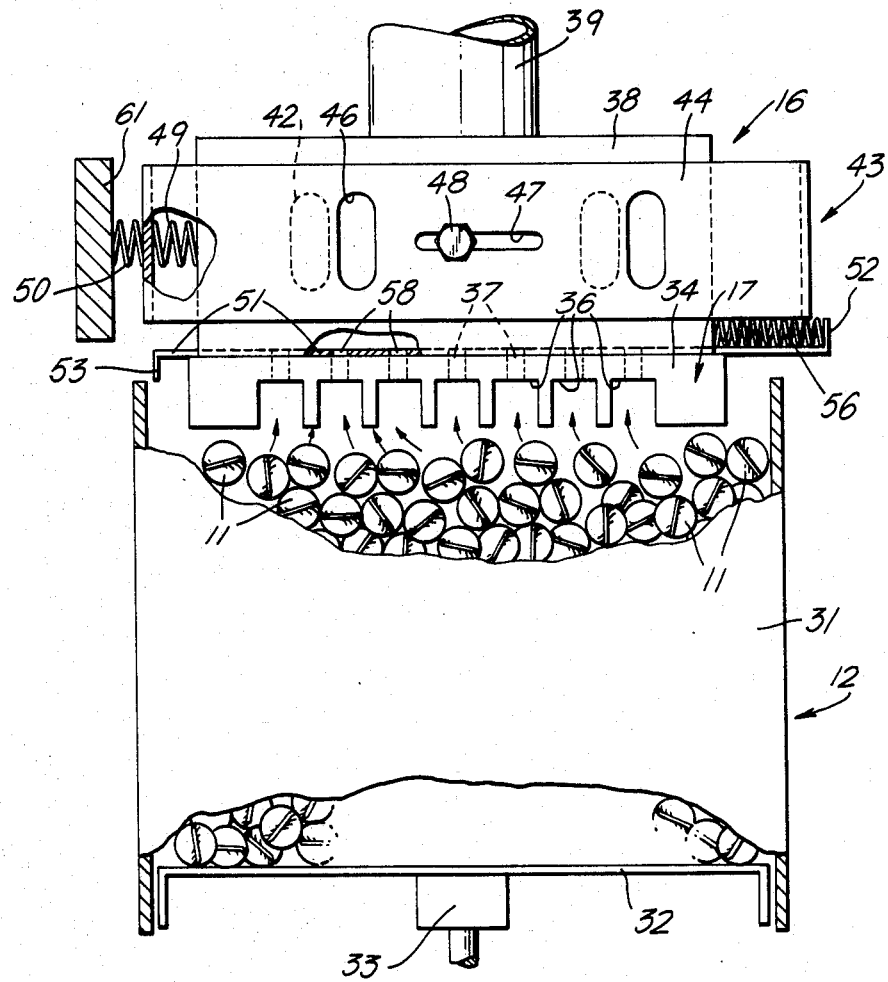
FIG. 2 is a diagrammatic part sectional view of part of the apparatus of FIG. 1 in a first position whereat the transfer means has been moved generally rightwardly in FIG. 1 to a transfer station to have turbolaters transferred thereto.

Referring to FIG. 2 there is shown in diagrammatic enlarged part section the transfer means 16 and container 12 containing turbolators 11 (which are shown end-on in this Figure). The container 12 comprises a rectangular section tube 31 of a width which generally corresponds to the length of the turbolaters 11. The container 12 has an open bottom which is closed by a movable plate 32. The movable plate 32 is moved by a hydraulic piston/cylinder assembly 33, there being provided two types of motion, a slow upward motion so as to maintain the upper of turbolaters 11 a predetermined distance below the top of the container 12 and a second, vibratory, motion of approximately 1 cm to throw the tubolaters 11 up in the air. There are provided holes in the side of the rectangular tube 31 to allow air access to the inside of the container 12 and to generate an air flow upwardly through the container 12. The container 12 is mounted to the frame 24.

The transfer means 16 is also illustrated in FIG. 2. It comprises a plate 34 of steel comprising the cover 17. When the transfer means 16 is in the first position illustrated in FIG. 2, the plate 34, which is slightly smaller in extent than the open top end of the container 12, enters the container 12 until it is about 3 mm above the top surface of the turbolaters. The underside of the plate 34 includes a predetermined number of grooves 36, in the present instance seven grooves 36 which are of rectangular cross section and which extend in a direction parallel to the axes of the turbolaters 11 within the container 12. In the central region of the plate 34 there are provided bore holes 37 which pass from the top surface of the plate 34 through to the grooves 36. The plate 34 includes further holes passing from the top to the bottom surface which are not aligned with the grooves 36.

Figure 6:
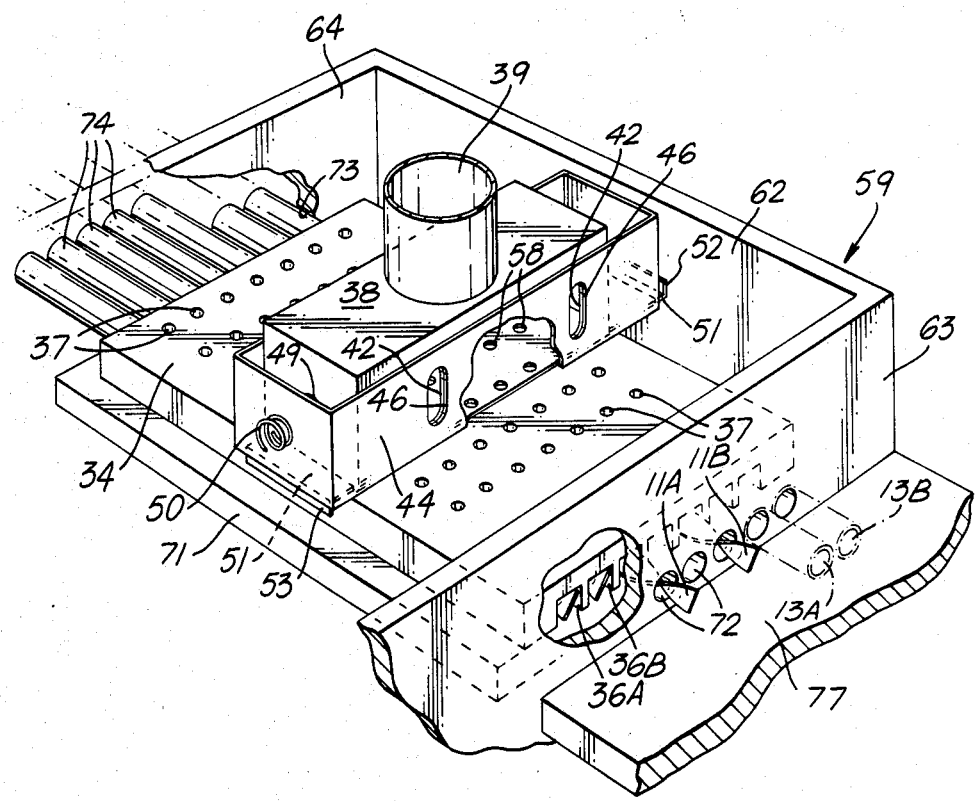
FIG. 6 is a perspective view of part of the apparatus with the part of the apparatus shown in FIG. 4 in the third position, the view being taken in a direction approximately from numeral arrow B in FIG. 1.

As is clear from FIG. 2 and FIG. 6, a vacuum chamber 38 is mounted to the top surface of the plate 34 in sealing engagement therewith. The vacuum chamber 38 extends substantially to the opposite edges of the plate 34 as shown in FIG. 2 but only otherwise over the middle region of the plate 34. To the top of the vacuum tube 38 is mounted a single tube outlet 39 to which is connected (not shown in FIG. 2) a vacuum tube 41 (see FIG. 1). In general terms, therefore, a vacuum applied through the vacuum tube 41 to the interior of the vacuum 25 chamber 38 causes a rapid air flow through the holes 37 from the interior of the container 12.

The side walls of the vacuum chamber 38 include holes 42 and the vacuum chamber 38 is surrounded by a rectangular frame 43 forming an obturator plate 44 on each side of the vacuum chamber 38. The obturator plates 44 each include holes 46 which, in one position of the frame 43 (shown in FIG. 2) are spaced from the holes 42 and in another position (illustrated in FIGS. 3, 4 and 6) align with the holes 42. The sliding motion of the frame 43 is controlled by a slot 47 in each obturator plate 44 through which passes a bolt 48 attached to the vacuum chamber 38. A spring 49 acts between one end of the vacuum chamber 38 and the frame 43 so as to urge the frame 43 to the left in FIG. 2 so that the natural position of the frame 43 is that shown in FIG. 3, that is, with the holes 42 and 46 aligned and a further spring 50 is mounted on the frame 43 to extend oppositely to spring 49.

A further obturator plate 51 is provided which extends across the floor of the vacuum chamber 48 and out at each end of the vacuum chamber 38, the portions extending outside the vacuum chamber 38 being bent at each end to form abutments 52, 53, a spring 56 being mounted between the abutment 52 and the adjacent end wall of the vacuum chamber 38. The obturator plate 51 includes holes 58 which may be aligned with the holes 37 in the natural position of the obturator plate 51 shown in FIG. 2.

As will be understood from FIG. 1, the transfer means 16 is movable between a position in which it overlies the container 12 to a position adjacent the radiator 14. This movement is controlled by means of a rectangular frame 59 having a first end wall 61 adjacent the container 12, a second end wall 62 adjacent the feed mechanism 21 and two side walls 63, 64.

The side walls 63, 64 each include on their inner surface a track 66 which cooperates with projection means (not shown) on the plate 34 to guide the transfer means 60 in a manner to be described hereafter.

The transfer means 16 is moved by the hydraulic piston/cylinder member 19.

The feed mechanism 21 will now be described with particular reference to FIGS. 1, 4 and 6. Adjacent the end wall 62 there is provided a base wall 71 which extends from side to side between the side walls 63 and 64. Opposite the position in which the transfer means comes to rest at the feed mechanism 21 there are provided holes 72, 73 in respective side walls 63, 64, the holes 72, 73 aligning with the grooves 36. Mounted outside the frame 59 beyond the side wall 64 are seven circular section rods 74 the front ends of which project into the holes 73 in the side wall 64. The rear ends of the rods 74 are clamped together by means of a bar 76, the bar 76 including mounting means for connecting with the hydraulic piston/cylinder assembly 23.

On the opposite side of the frame 59 beyond the side wall 63 there is provided a base plate 77 to which is mounted by means of releasable clamps 25 the radiator 14. The clamps 25 are arranged so as to align the tubes 13 of the radiator 14 with the holes 72.

The apparatus thus far described is operated in the following manner.

The container 12 is filled with turbolaters 11 with the plate 32 withdrawn to its lowermost position. This operation may be carried out by simply filling the container with the turbolaters when in situ or providing a form of container 12 which is detachable from the apparatus 10 and is filled at a point remote from the apparatus 10 and reconnected to the apparatus 10 when full. In other words, the rectangular tube 31, and bottom plate 32 may be a removable item which can be filled remote from the apparatus 10.

The hydraulic piston/cylinder assembly 33 is then caused to operate so that the top surface of the turbolaters 11 is adjacent the open top of the tube 31 and the turbolaters are vibrated (ie repeatedly thrown upwardly by about 1 to 2 cm) by the plate 32.

The transfer means 16 is then moved to the position shown in FIG. 2 that is above the container 12 with the lower surface of the plate 34 approximately 3 mm from the upper surface of the turbolaters in the container. In this position the spring 50 of the frame 43 abuts the end wall 61 and the frame 43 is moved to the right with respect to the vacuum chamber 38 in which position the holes 42 and 46 are not aligned. The obturator plate 51 however is in a position in which the holes 58 and 37 are aligned. In this position vacuum is applied to the interior of the vacuum chamber 38 via the vacuum tube 41. Air is caused to flow rapidly into the vacuum chamber 38 through the holes 37 which thereby causes an air flow upwardly in the container 12. The hydraulic piston/cylinder assembly 19 is then operated to oscillate the transfer means 16 back and forth (ie from right to left in FIG. 2). The reason for this back and forth motion is that unlike, for example, in U.S. Pat. No. 4,162,018, the turbolaters are not arranged in predetermined regular positions but are substantially randomly orientated and it is necessary to carry out this movement to ensure that all of the grooves 36 closely pass over a turbolater in the container. As the plate 34 is moved over the upper surface of the turbolaters the air flow up through the container and through the holes 37 causes the turbolaters adjacent the top of the container 12 to be lifted and as the maximum air flow is adjacent the holes 37 they are urged into engagment with the grooves 36. It will be understood that the grooves 36 are of a section slightly larger than that of the turbolaters 11 and therefore a turbolater entering a groove 36 will be a snug fit therein.

In this way therefore seven turbolaters are lifted from the top layer of turbolaters into the grooves 36. They are retained there by the airflow through the holes 37. The vibration of the plate 32 of course assists in disentangling the turbolaters at the top layer of turbolaters 11 so as to cause them to be readily freed from one another and allows them to engage the grooves 36 as above described.

Figure 3:
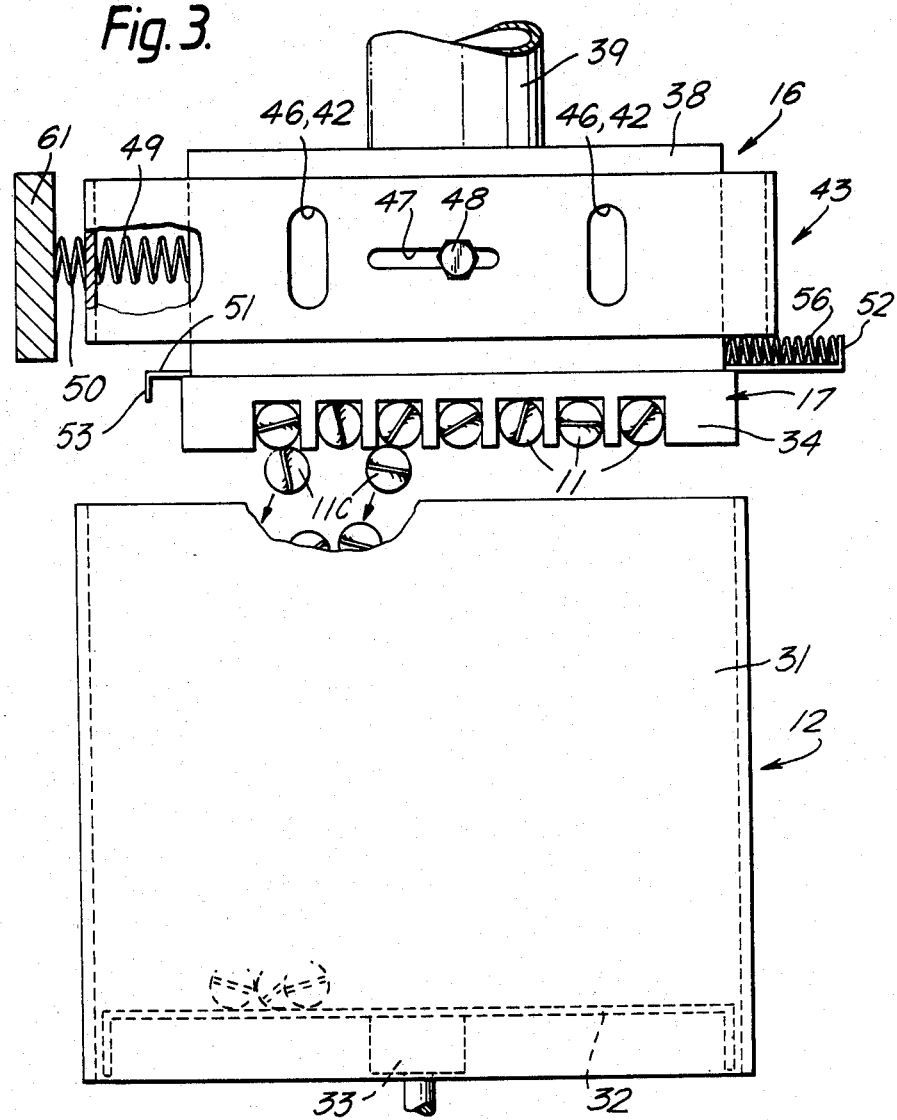
FIG. 3 is a diagrammatic view similar to FIG. 2 of the same part of the apparatus in a second position.

Owing to the high rate of flow of air through the holes 37 and the low weight of the turbolaters it may be that, as is illustrated in FIG. 3, some other turbolaters (11C in FIG. 3) are sucked into engagement with the plate 34. However this is discouraged by the oscillation of the plate 34 because as the transfer means 16 moves to the right in FIG. 2 the holes 42 and 46 become partially aligned. This allows air to flow into the vacuum chamber 38 through the holes 42 and 46 which thereby reduces the vacuum therein and reduces the airflow through holes 37. Unless the turbolaters are engaged in the grooves 36 they will tend to drop off the plate 34.

The hydraulic piston/cylinder assembly 19 is then actuated to move the transfer means 16 away from the container 12. The engagement of the track 66 and the projecting means on plate 34 causes the transfer means to be lifted at the same time as it is moved to the right in FIG. 2 and towards its FIG. 1 position. Thus after a short time an intermediate second position shown in FIG. 3 is reached.

It will be seen from FIG. 3 that there are still some turbolaters 11C (two in number) attached to the plate 34 but not engaging in the grooves 36. As already described the transfer means 16 moves away from the end wall 61 the obturator plate 44 is allowed to move to the left with respect to the vacuum chamber 38 and in this position shown in FIG. 3 the holes 42 and 46 come into alignment with one another. This means that an air flow into the vacuum chamber 38 is allowed through the holes 42, 46 which reduces the air flow through the holes 37. This reduction in air flow, whilst sufficient to maintain the turbolaters which 15 are in the grooves 36, is not sufficient to maintain engagement of the other turbolaters 11C with the plate 34 and these, as indicated in FIG. 3, will then fall back into the container 12.

Figure 4:
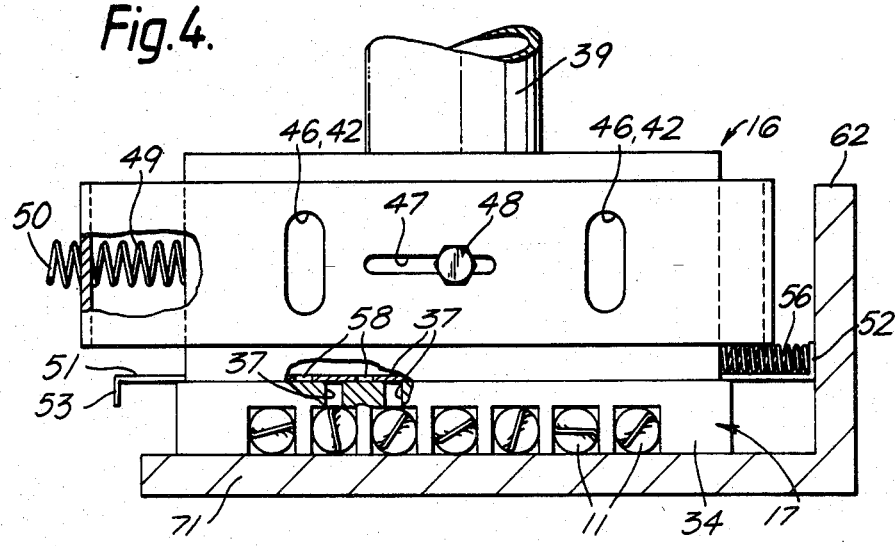
FIG. 4 is a diagrammatic view similar to FIG. 2 of the same part of the apparatus in a third position, the view being taken generally in the direction of arrows A—A in FIG. 1.

The transfer means 16 continues to move to the right in FIGS. 2, 3 and 4 until it comes to abut the opposite end wall 62. This position is shown in FIG. 4. It will be understood that the track 66 and projecting means 67 cause the transfer means 16 to move downwards whereby the plate 34 abuts the base wall 71. In the position shown in FIG. 4, therefore, the turbolaters 11 in the grooves 36 are properly located between the grooves 36 and the base wall 71.

In the position shown in FIG. 4 the abutment 52 is engaged by the end wall 62 so as to move the obturator plate 51 to the position shown in FIG. 4 in which the holes 37 and 58 are no longer in alignment. This shuts off the flow of air to the grooves 36 so that the turbolaters 11 are released although of course they are held in position physically by the grooves 36 and base wall 71. The position shown in FIG. 4 is also illustrated in FIG. 6.

Referring to the right hand part of FIG. 6 the position thus far described is illustrated with respect to grooves 36A, 36B. The Figure also shows the positioning of the tubes 13 (13A, 13B in FIG. 6) of a radiator mounted on the base plate 77 by the clamping means 25. The hydraulic piston/cylinder assembly 33 is then operated so as to move the rods 74 from the position in which their front ends are in the side wall 64 to a position in which they move into the grooves 36. The leading edges of the rods 74 will engage the rear ends of the turbolaters within the grooves 36 and begin to push them out of the grooves 36 and through the holes 72 in the side wall 63. Turbolaters 11A and 11B in FIG. 6 illustrate the way in which the leading end of the turbolaters passes through the holes 72 and extends out of the holes 72 and beyond the side wall 63. Of course the tubes 13 of the radiator are aligned with the holes 72 so that the turbolaters are pushed by the movement of the rods 74 into the tubes 13 of the radiator 14. Eventually the leading ends of the rods 74 will protrude through the holes 72 so as to fully engage the turbolaters 11 within the tubes 13 of the radiator 14.

Thereafter the radiator may be removed and the rods 74 withdrawn so that their leading ends are within the side wall 64 and then the transfer means 16 may be moved back to the position shown in FIG. 2. The process may be repeated.

In use of the apparatus shown seven turbolaters were removed from the container 12 and inserted into a radiator having seven tubes 13 within ten seconds. The cycle could be repeated within that time scale.

Clearly however it is not necessary to limit the number of turbolaters which may be inserted in this way to seven. Any suitable number may be provided and means may be provided so as to change the numbers of holes in the side walls 63 to accommodate the particular radiator to be filled, and to change the number of rods 74. Different diameters may also be used.

Although the apparatus has been described with respect to removal of turbolaters from a container and insertion into a radiator, similar apparatus may be used to remove precut lengths of tube from a container and to insert these into, for example, a frame comprising the plates forming the fins of a radiator so as to construct a radiator core. Other similar uses are also envisaged.

The operation of the hydraulic piston/cylinder assemblies may be controlled by the valves 28 which in turn may be controlled by electrical microswitches and other sensors.

The turbolaters which are described so far in the specification are of circular cross section and the tubes in the radiators or heat exchangers are of similar cross-section.

It has been proposed to improve the heat transfer characteristics of radiators or heat exchangers by providing tubes which are not circular in cross-section but are elliptical. Thus in a radiator for a motor car the long axis of the ellipse will coincide with the direction of motion of the vehicle which means that the tubes will be somewhat more streamline and thus air will remain in contact with the tube around the back surface of the tube to a greater extent than with circular section tubes.

If turbolaters are to be inserted in elliptical tubes then the handling apparatus and method so far described requires modification as is illustrated in FIGS. 7 to 12 in which the same reference numerals will be used for substantially identical parts as those shown in FIGS. 4 to 6, and those parts which have been modified will carry the same reference numeral with the addition of a prefix (1).

In general terms the apparatus of FIGS. 7 to 12 is similar to that of FIGS. 1 to 6. However, the cover 17 incorporates grooves 136 which are of different section to the grooves 36 in the embodiment described in FIGS. 1-6. In the previous embodiment the grooves were of rectangular cross-section whereas, as is clear from FIG. 9, the grooves incorporate an upper surface 136A which is generally elliptical in shape.

Figure 7:
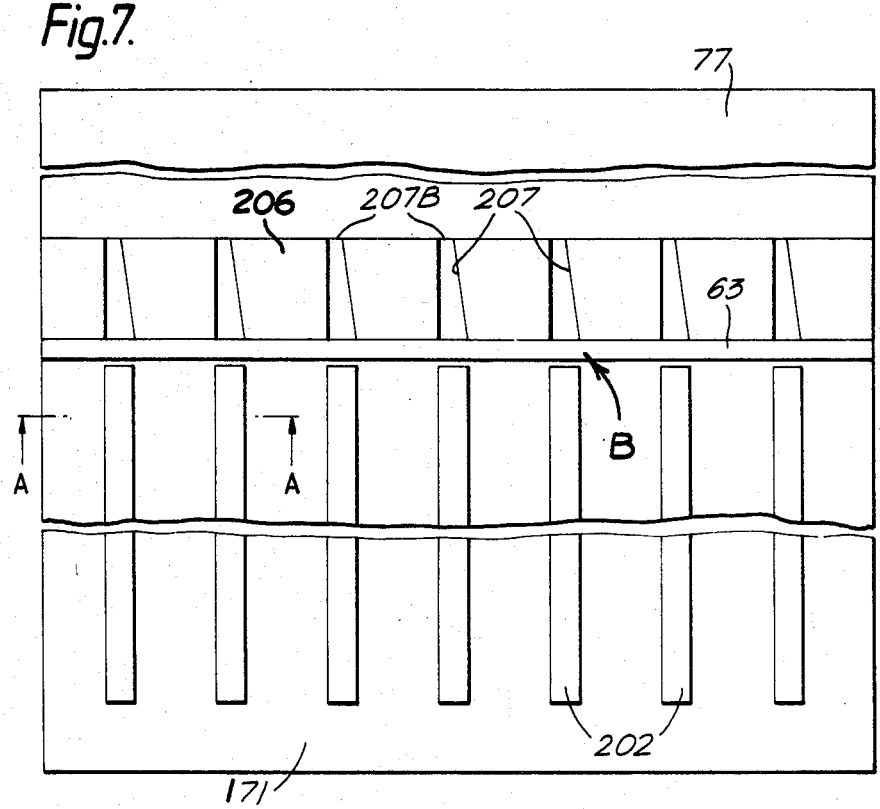
FIG. 7 is a diagrammatic plan view of a modified base wall forming part of the apparatus of the invention, and further including an additional intermediate section 206.
Figure 8:
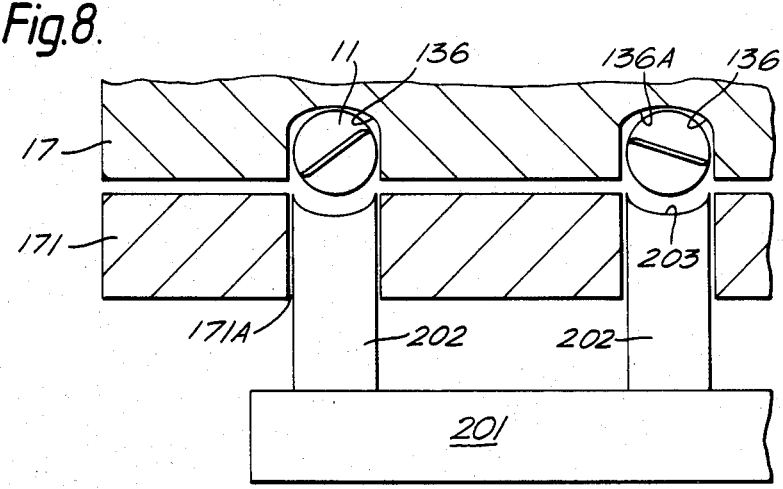
FIG. 8 is a section on line A—A of FIG. 7, but further showing the disposition of a cover on the base wall.

A base wall 171 which corresponds generally to the base wall 71 of FIG. 4 is shown in FIGS. 7 and 8. The base wall 171 includes slots 171A extending therethrough, the slots 171A generally extending parallel to and being coextensive with the grooves 136 in the cover 17. Mounted below the base wall 171 is a reciprocating plate 201 which carries a plurality of upstanding rectangular blocks 202. The arrangement is such that a horizontal section which the upstanding blocks 202 are of a horizontal section which corresponds to the slots 171A so that when the reciprocating plate 201 is in its normal withdrawn position the upper edges 203 of the upstanding blocks 202 cooperate with the upper surface of the base wall 171 so as to provide a generally flat upper surface.

However the upper edges 203 have a part elliptical transverse cross-section as is clear from FIG. 2. Means may be provided to reciprocate the plate 201 in the form of a cam or, preferably, a hydraulic ram (not shown).

The arrangement of FIG. 6 is modified as follows. An intermediate section is mounted between the wall 63 and the tubes 13A, 13B of the radiator so that the radiator will be disposed further to the right than in FIG. 6. This intermediate section comprises a section 206 to rotate the turbolaters 11 as they are fed towards the radiator and is is illustrated in more detail in FIGS. 10 and 11. The section 206 comprises a plurality of channels 207, a respective one channel 207 being aligned with each hole 72, the channels being open channels and an inner end 207A having a square cross-section adjacent the hole which corresponds in width to the maximum width of the turbolaters (which, as will be clear hereafter will be of elliptical cross-section) and an outer end 207B having a rectangular cross-section end, the width of the rectangular cross-section generally corresponding to the minimum width of the turbolaters, that is the width of the turbolaters parallel to their minor axes.

If necessary the channels 207 may be closed by a cover plate.

The radiator tubes 13A, 13B will be aligned with the outer end of the channels 207.

Figure 12:
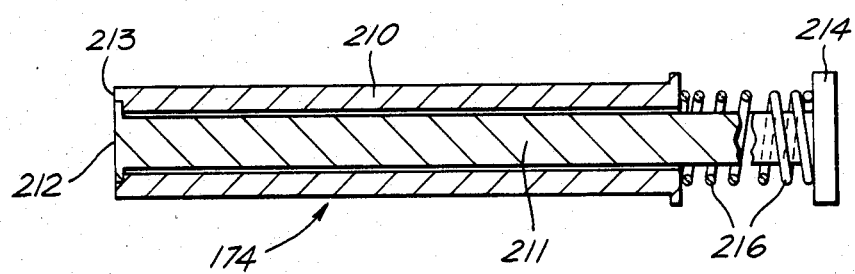

In the arrangement of FIGS. 1 to 6 the rod 74 is of solid construction but in the modified arrangement as is illustrated in FIG. 12, the rods 174 are of a composite structure. Thus the rods 174 each comprise a hollow tube 210 within which is mounted a solid rod 211, the outer diameter of the solid rod 211 and inner diameter of the hollow tube 210 being substantially the same and the front end 212 of the solid rod 211 and the front end 213 of the hollow tube 210 being normally mounted coplanar with one another. The rear end of the solid rod 211 extends out of the hollow tube 210 and carries at its rear end an enlarged portion 214, a coil spring 216 being mounted between the enlarged portion 214 and the rear end of the hollow tube 210.

Figure 9:
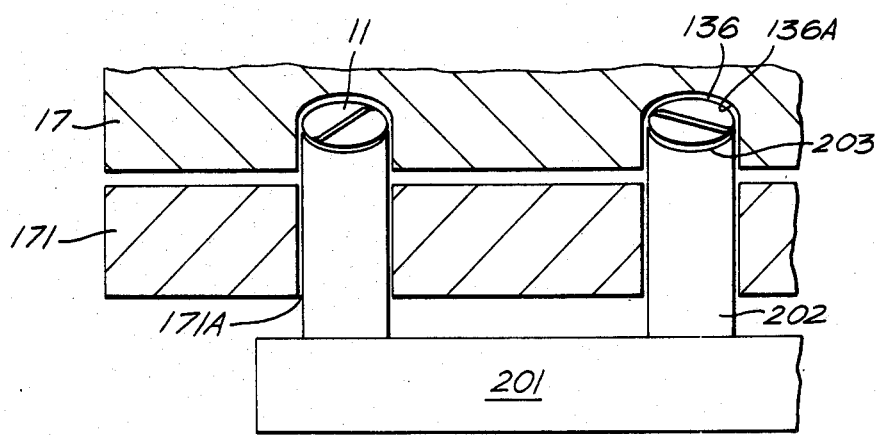
FIG. 9 is similar to FIG. 8 showing the modified apparatus in use.
Figure 10:
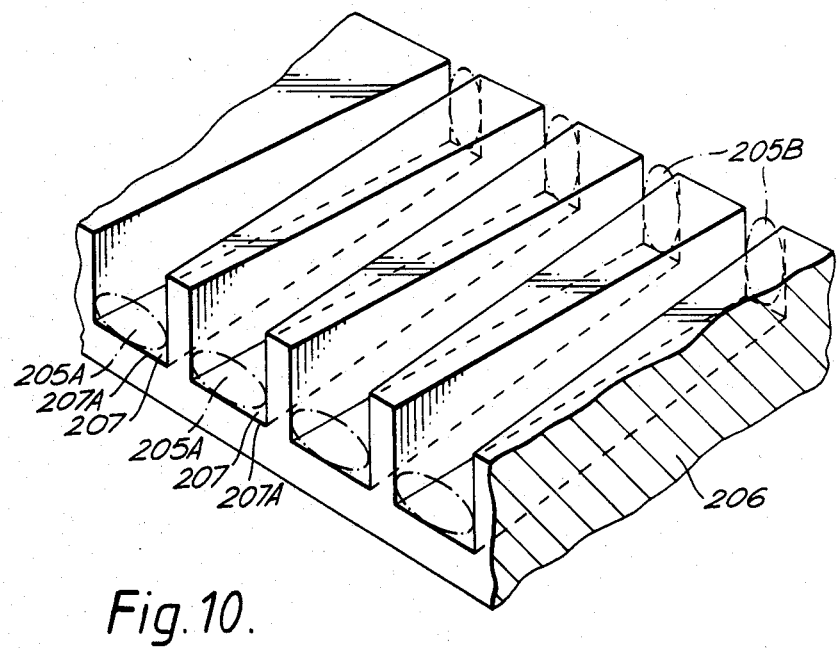
FIG. 10 is a perspective view of part of the modified apparatus, namely, an enlarged section or added intermediate section 206, taken generally in the direction of arrow B in FIG. 7.
Figure 11:
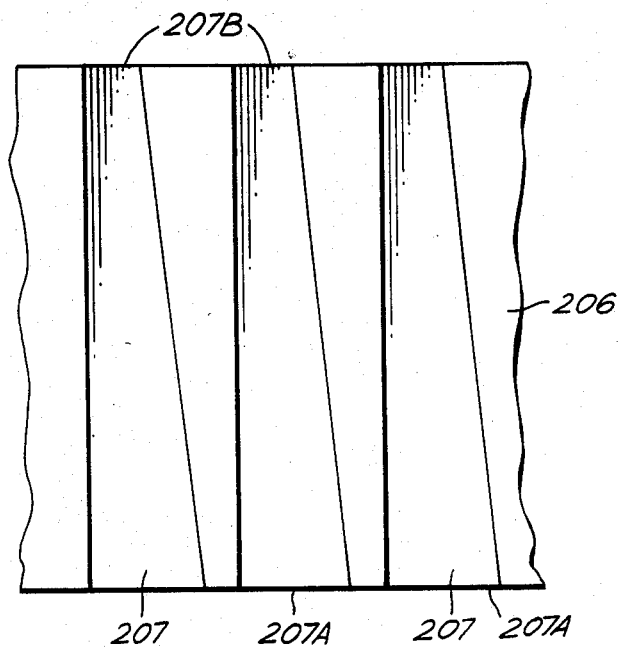
FIG. 11 is a top plan view of the intermediate section shown in FIG. 10, and, FIG. 12 is a sectional view of a rod of the modified apparatus that is substituted for each rod 74 in FIGS. 1 and 6.

The apparatus operates in the same manner as the arrangement of FIGS. 1 to 6 except as follows. When the apparatus reaches the position shown in FIG. 4, that is with the cover 17 overlying the base wall 171 the reciprocal plate 201 is raised so that the upper edges 203 are no longer coplanar with the upper surface of the base wall 171 but extend upwardly towards the grooves 136. As each of the grooves 136 is mounting a turbolater 11 the effect of this is to deform each turbolater 11 between the respective upper surface 136A of respective groove 136 and upper edge 203 of upstanding block 202. This is illustrated in FIG. 9. In this way a turbolater of elliptical cross-section is formed from the turbolater of circular cross-section. The reciprocating plate 201 is then lowered slightly so as to free the turbolaters 11 within the grooves 136 and the rods 174 are moved so as to feed the turbolaters 11 as before out of the grooves 136.

The elliptically shaped turbolaters are, however, arranged at this time with their major elliptical axes at right angles to that which is desired to be fed into the tubes 13 of the radiator. It is necessary therefore to rotate each of the turbolaters about its axis by 90°.

This is effected by feeding the turbolaters 11 through the holes 72 and into the channels 207. It will be understood that the side wall 209 of each channel 207 will cause the turbolaters to rotate about their axis through 90° from the disposition shown at 205A to the position shown at 205B.

However it will be understood further that a solid rod 74 of the type shown in FIG. 6 would jam in the channel 207. However with the construction of rod 174 illustrated in FIG. 12 the turbolater is fed by the rod 174 whilst in the form shown in FIG. 12 until the front of the rod 174 passes into the channel 207. At some point along the length of the channel 207 the diameter of the outer hollow tube 210 will correspond with the width of the channel 207 and at that point it will stop moving forward but the inner rod 211 will be able to continue to move and feed the turbolater 11 forwards, the diameter of the rod 21 being less than the width of the channel 207 at its outer end. In this way, therefore, the turbolater may be rotated by the channel 207 and fed completely into the tubes 13 of the radiator.

The invention is not restricted to the details of the foregoing example.

I claim:

1. Apparatus for transferring relatively lightweight and randomly arrayed objects from an open top container to a work station, said apparatus comprising an open top container containing a plurality of said objects arranged generally randomly therein, cover means positionable to overlie said container including on its underside one or more shaped portions to each receive and snuggly retain a respective one of said objects, holes defined through said cover means and terminating at inlets in the shaped portions of the cover means, means for moving said cover means to a first position in which it at least substantially covers the objects in the container, means for continuously producing, whilst said cover means is in said first position, an airflow through the holes in said cover means and in said container upwardly towards said cover means to cause some of the objects to engage and be held within the shaped portions of the underside of said cover means, the cover moving means actuatable to move said cover means to a second position, adjacent to said work station, and means for reducing said airflow to cause objects other than those engaged in said shaped portions to detach from said cover means, said reduced airflow being sufficient to maintain objects snuggly engaged in said shaped portion.

2. Apparatus as claimed in claim 1 wherein said shaped portions (36) comprise grooves (36) on the underside of the cover means (17).

3. Apparatus as claimed in claim 2 wherein the grooves (36) are arranged parallel to one another and spaced a predetermined distance apart.

4. Apparatus as claimed in claim 2 further comprising vibrator means (19) for throwing the objects (11) in said container (12) upwardly towards said cover means.

5. Apparatus as claimed in claim 2 wherein the grooves (36) extend from side to side of the cover means (17) and further comprising feed means for moving the objects out of the grooves.

6. Apparatus as claimed in claim 5 wherein the feed means (21) comprises a plurality of rods (74) positioned and sized to enter the grooves (36) when the cover means (17) is in the second position.

7. Apparatus as claimed in claim 6 wherein said objects (11) comprise helically coiled objects and further comprising means (25) to mount a radiator (14) alongside the cover means (17) when in the second position and the predetermined distance between the grooves (36) corresponds to the distance between the tubes (13) in the radiator (14) so that the helically coiled objects (11) may be fed from the grooves (36) directly into the tubes (23) in the radiator (14).

8. Apparatus as claimed in claim 7 further comprising means (206) mounted between the cover means (17) when in the second position and said radiator (14) to rotate the helically coiled objects (11) about their longitudinal axes before they are fed into the tubes (13) in the radiator (14).

9. Apparatus as claimed in claim 8 wherein the last-mentioned means (206) comprises a plurality of channels (207) having a varying width so as to rotate the helically coiled objects (11) as they pass through.

10. Apparatus as claimed in claim 1 further comprising means for moving a bottom (32) of the container (12) up during operation of the apparatus so as to maintain an upper layer of the objects (11) within the container (12) adjacent the open top of the container (12).

11. Apparatus as claimed in claim 1 wherein the means for producing the airflow comprises a vacuum source (26) connected to the cover means (17).

12. Apparatus as claimed in claim 11 wherein the vacuum source (26) comprises a vacuum chamber (38) positioned above the cover means (17).

13. Apparatus as claimed in claim 1 further comprising a plate member overlying the cover means.

14. Apparatus as claimed in claim 1 wherein said shaped portions (36) include ellipitcal shaped upper surfaces (136a).

15. Apparatus as claimed in claim 14 wherein the cover moving means (18) is operable to move said cover means (17) to a third position positioned above means including pressing means (202) incorporating elliptical shaped surfaces (203) and means to move he pressing means (202) towards said shaped portions (36) so as to deform cylindrical section objects (11) to elliptical cross section.

16. Apparatus as claimed in claim 15 wherein the third position and second position are the same.

17. Apparatus for handling objects and moving them to a work station comprising
container means having an open top for retaining a plurality of relatively lightweight and randomly arranged objects therein,
cover means positionable on said container means to a first position for selectively covering the open top thereof,
means defining at least one recess on an underside of said cover means for receiving and snuggly retaining said object therein,
air passage means defined through said cover means and having an inlet defined in said recess for communicating an airflow through said cover means,
means for producing a continuous airflow within said container means directed towards the underside of said cover means and through said air passage means to impinge upon, lift, and retain said object in said recess, and
means for moving said cover means from said first position on said container means to a second position adjacent to said work station.

18. The apparatus of claim 17 further comprising obturator means disposed on said cover means for shutting-off airflow through said air passage means.

19. The apparatus of claim 17 further comprising means defining a vacuum chamber over said cover means, means for selectively drawing a vacuum in said vacuum chamber, and obturator means for permitting airflow to enter directly into said vacuum chamber to control the airflow through said air passage means.

20. A method for transferring relatively lightweight and randomly arranged objects from an open top container to a work station comprising the steps of
positioning a cover, having at least one recess defined on an underside thereof that is shaped to receive and snuggly retain a said object therein, over the open top of said container,
generating an airflow in said container, and
passing said airflow upwardly onto and around said object, towards the underside of said cover and into said recess, and through an air passage defined through said cover, to lift and retain the object in said recess.

21. Th method of claim 20 further comprising shutting-off airflow through said air passage.

22. The method of claim 20 further comprising applying a vacuum in a vacuum chamber disposed above said cover and permitting airflow to enter directly into said vacuum chamber to control the airflow through said air passage.

* * * * *